United States Patent
Ryu et al.

(10) Patent No.: US 10,852,211 B2
(45) Date of Patent: Dec. 1, 2020

(54) APPARATUS AND METHOD FOR GAS LEAKAGE MEASUREMENT IN A HIGH PRESSURE REACTOR

(71) Applicant: KOREA INSTITUTE OF ENERGY RESEARCH, Daejeon (KR)

(72) Inventors: Ho-jung Ryu, Daejeon (KR); Doyeon Lee, Daejeon (KR); Gyoung-tae Jin, Daejeon (KR); Chang-keun Yi, Daejeon (KR); Do-won Shun, Daejeon (KR); Jae-hyeon Park, Daejeon (KR); Dal-hee Bae, Sejong-si (KR); Sung-ho Jo, Daejeon (KR); Seung-yong Lee, Daejeon (KR); Young Cheol Park, Daejeon (KR); Jong-ho Moon, Seoul (KR); Dong-ho Lee, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 243 days.

(21) Appl. No.: 16/011,439

(22) Filed: Jun. 18, 2018

(65) Prior Publication Data

US 2019/0323916 A1 Oct. 24, 2019

(30) Foreign Application Priority Data

Apr. 24, 2018 (KR) .................. 10-2018-0047454

(51) Int. Cl.
*G01M 3/28* (2006.01)
(52) U.S. Cl.
CPC ............................... *G01M 3/2807* (2013.01)

(58) Field of Classification Search
CPC ..................... G01M 3/2807; G01M 3/3254
See application file for complete search history.

(56) References Cited

U.S. PATENT DOCUMENTS

| | | | | |
|---|---|---|---|---|
| 5,415,033 A * | 5/1995 | Maresca, Jr. | ....... | G01M 3/2807 73/40.5 R |
| 7,082,813 B2 * | 8/2006 | Grosse-Bley | ......... | G01M 3/202 73/40.7 |
| 7,152,494 B2 * | 12/2006 | Peacey | .................... | A62B 7/14 73/865.9 |

(Continued)

FOREIGN PATENT DOCUMENTS

| JP | 11-351922 A | 12/1999 |
|---|---|---|
| JP | 2005-37268 A | 2/2005 |

(Continued)

*Primary Examiner* — John Fitzgerald
(74) *Attorney, Agent, or Firm* — Birch, Stewart, Kolasch & Birch LLP

(57) ABSTRACT

Disclosed herein are an apparatus and method for gas leakage measurement in a high pressure reactor. In particular, the present invention relates to an apparatus for gas leakage measurement in a high pressure reactor including: a gas inlet; a first valve equipped to one side of the gas inlet; a flowmeter; a pressure gauge measuring an internal pressure of the reactor; a gas outlet; and a second valve, wherein if in internal pressure reaches a preset pressure by closing the second valve and injecting a gas to the reactor through the flowmeter in the state of opening the first valve, the gas leakage status in the reactor is measured through pressure changes in the pressure gauge after closing the first valve.

4 Claims, 7 Drawing Sheets

(56) References Cited

U.S. PATENT DOCUMENTS

| | | | | |
|---|---|---|---|---|
| 7,290,440 | B2 * | 11/2007 | Gocho | G01M 3/2815 |
| | | | | 73/49.2 |
| 8,770,012 | B2 * | 7/2014 | Yahashi | G01M 3/26 |
| | | | | 73/40 |
| 10,288,517 | B2 * | 5/2019 | Ramakrishnan | G01N 15/088 |
| 10,365,202 | B2 * | 7/2019 | Ramakrishnan | G01N 15/088 |
| 2006/0156795 | A1 * | 7/2006 | Perkins | G01M 3/202 |
| | | | | 73/40.7 |
| 2012/0136579 | A1 * | 5/2012 | Kvernvold | E21B 47/117 |
| | | | | 702/12 |
| 2013/0014855 | A1 * | 1/2013 | Yahashi | F17C 5/00 |
| | | | | 141/1 |
| 2016/0160635 | A1 * | 6/2016 | Langseth | G01M 3/283 |
| | | | | 73/40.5 R |
| 2019/0094100 | A1 * | 3/2019 | Saha | G01M 3/025 |

FOREIGN PATENT DOCUMENTS

| | | | |
|---|---|---|---|
| JP | 2006-084263 A | * | 3/2006 |
| JP | 4281001 B2 | * | 6/2009 |
| KR | 10-0291635 B1 | | 12/2001 |
| KR | 10-0929680 B1 | | 12/2009 |
| KR | 10-1131948 B1 | * | 3/2012 |

* cited by examiner

[FIG. 1]
RELATED ART
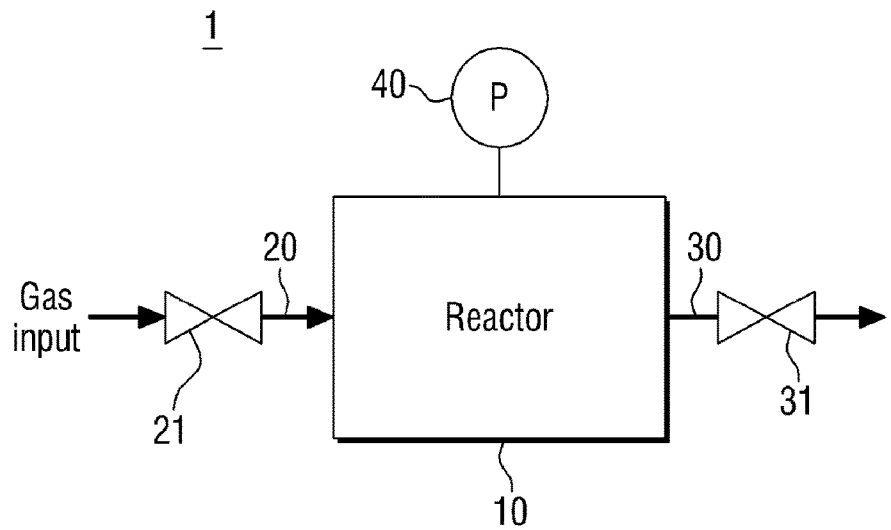
[FIG. 2]
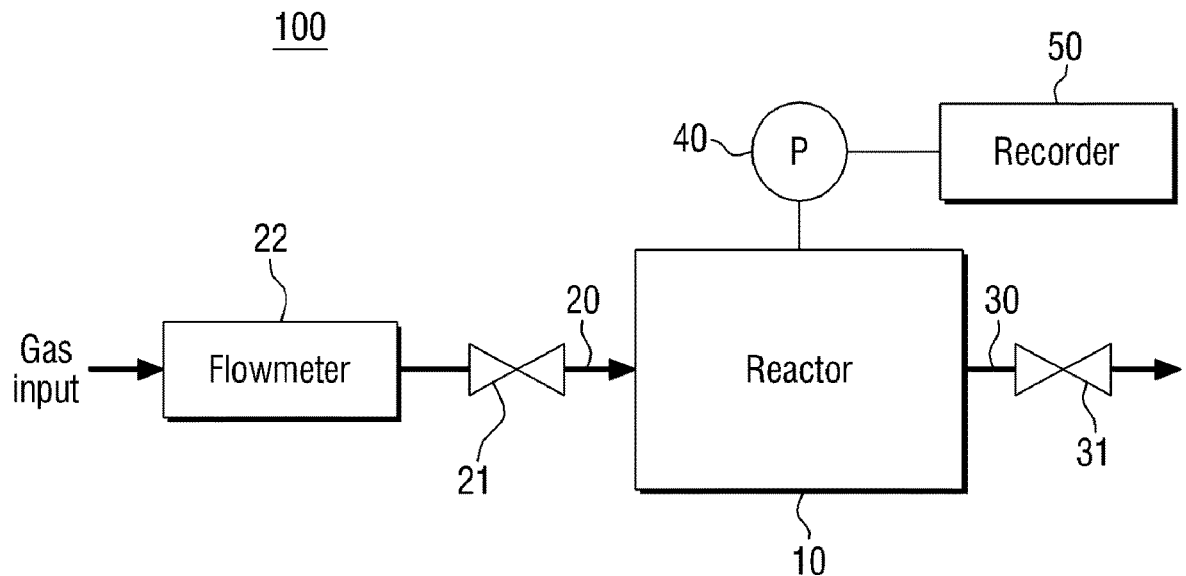

[FIG. 3]
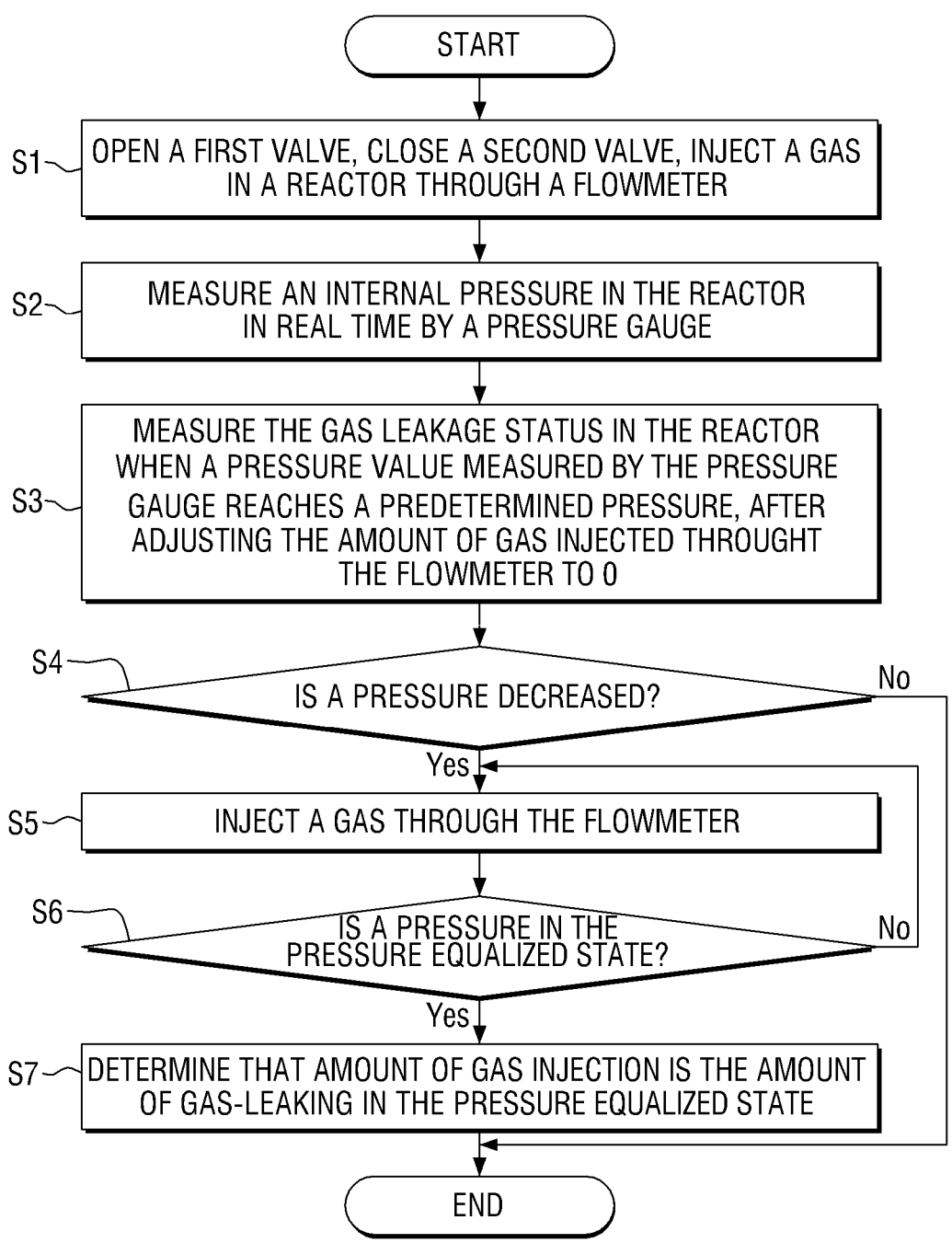

[FIG. 4]
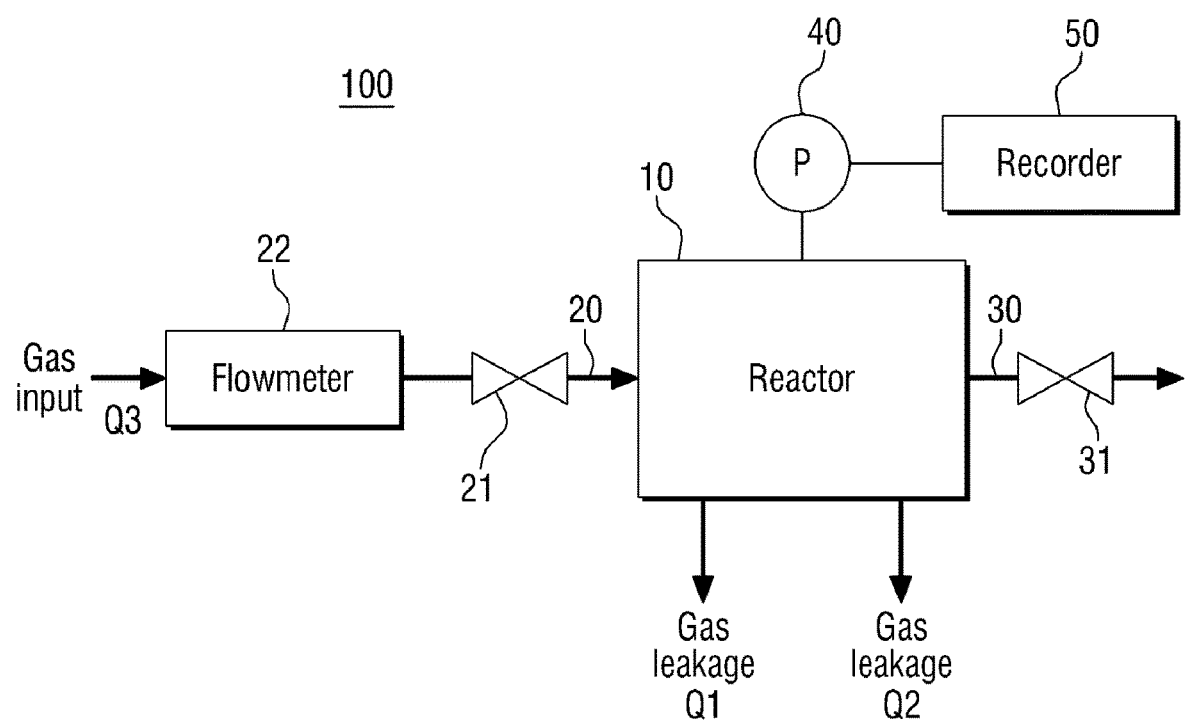

[FIG. 5]
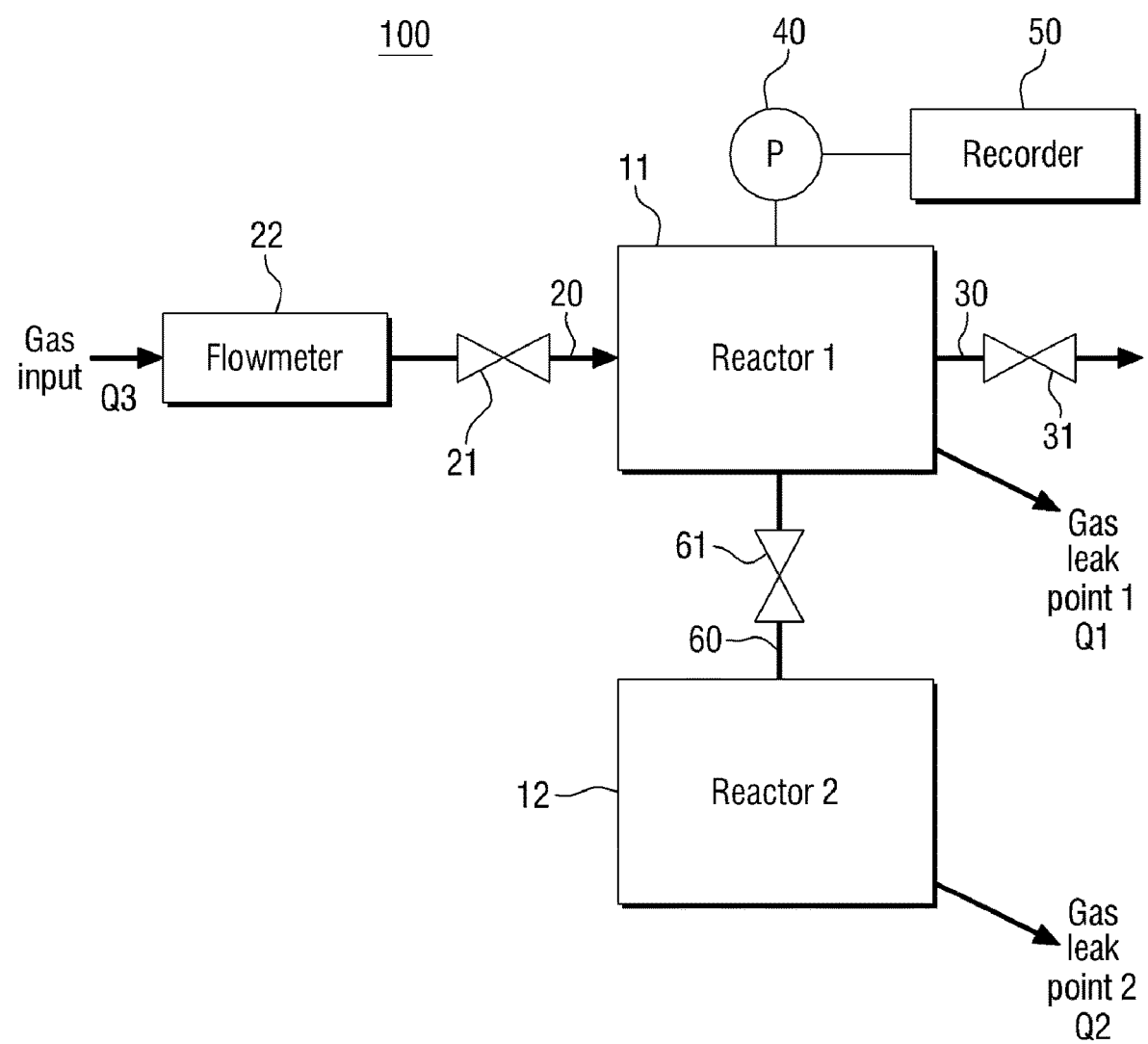

[FIG. 6]
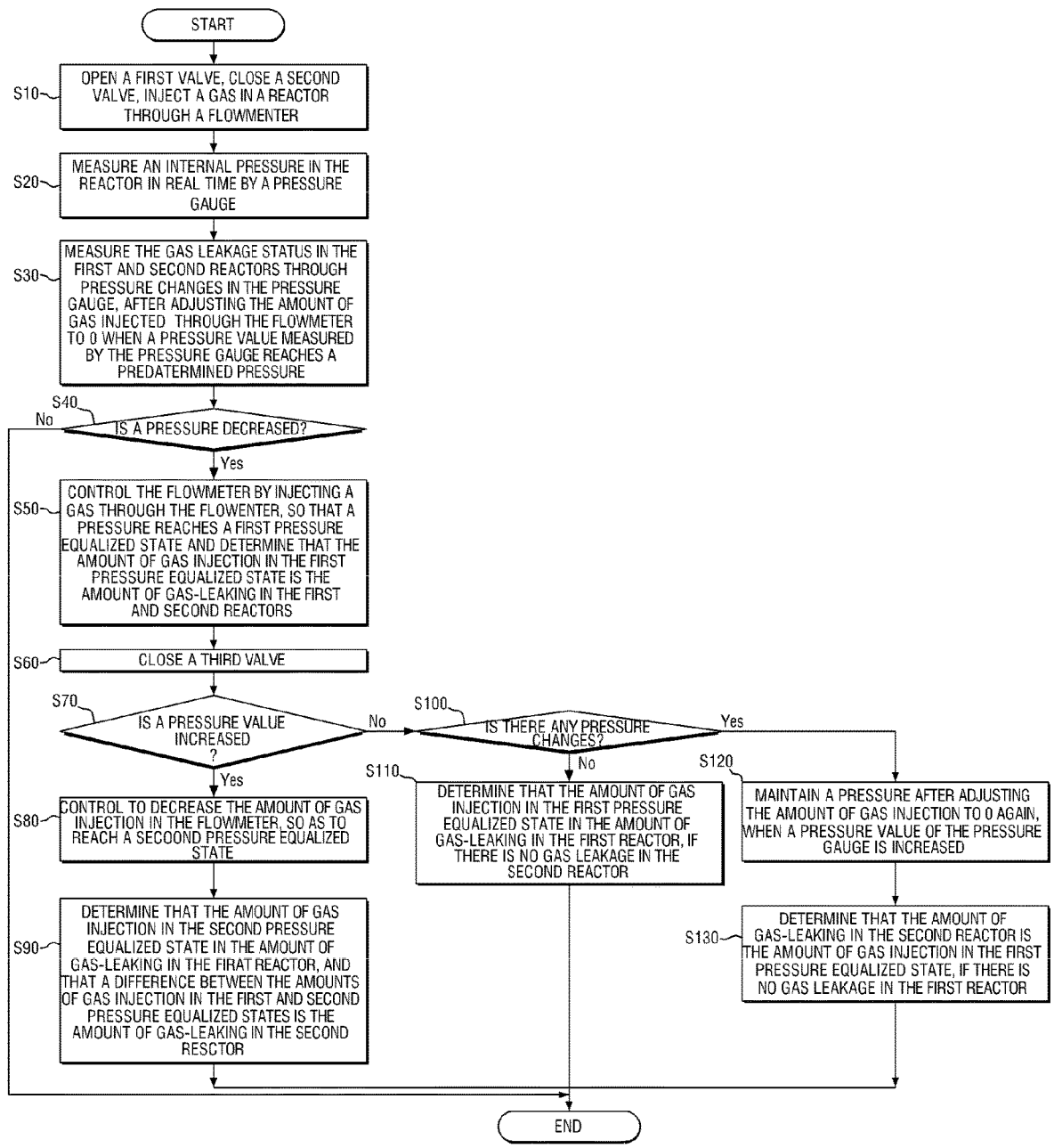

[FIG. 7]
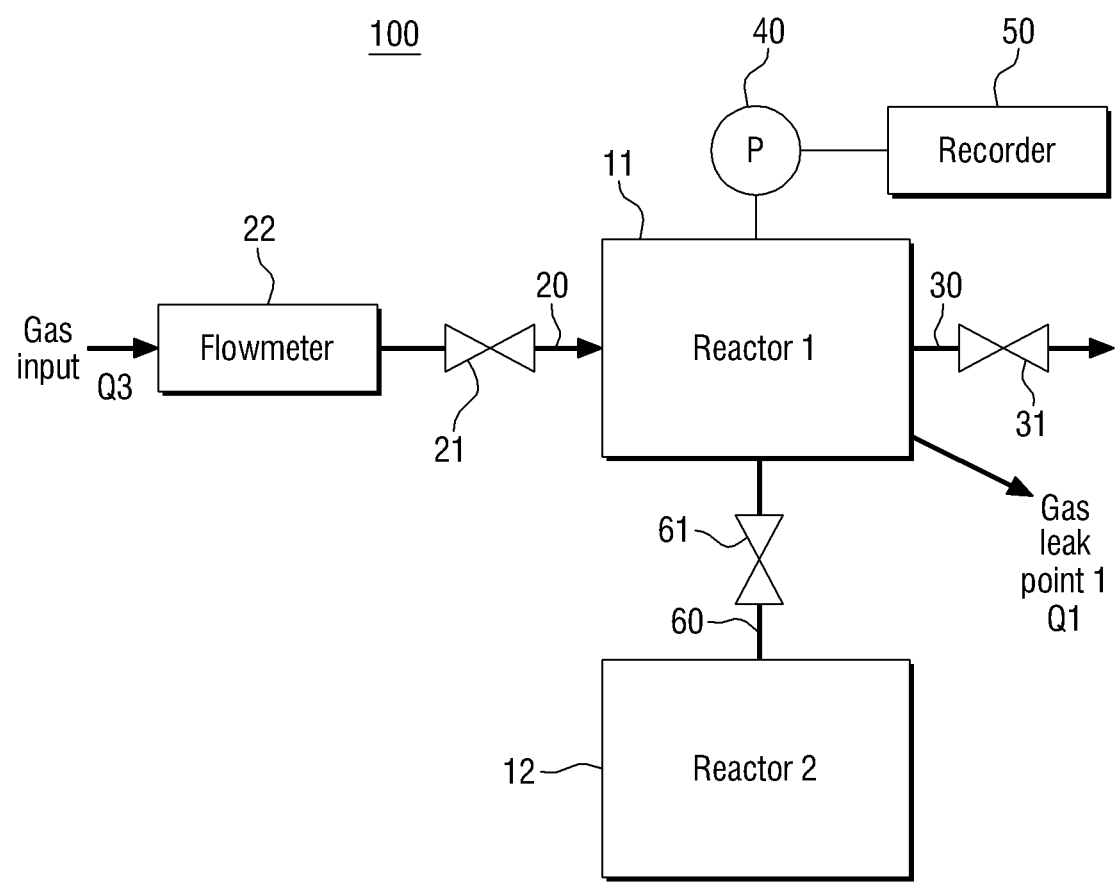

[FIG. 8]
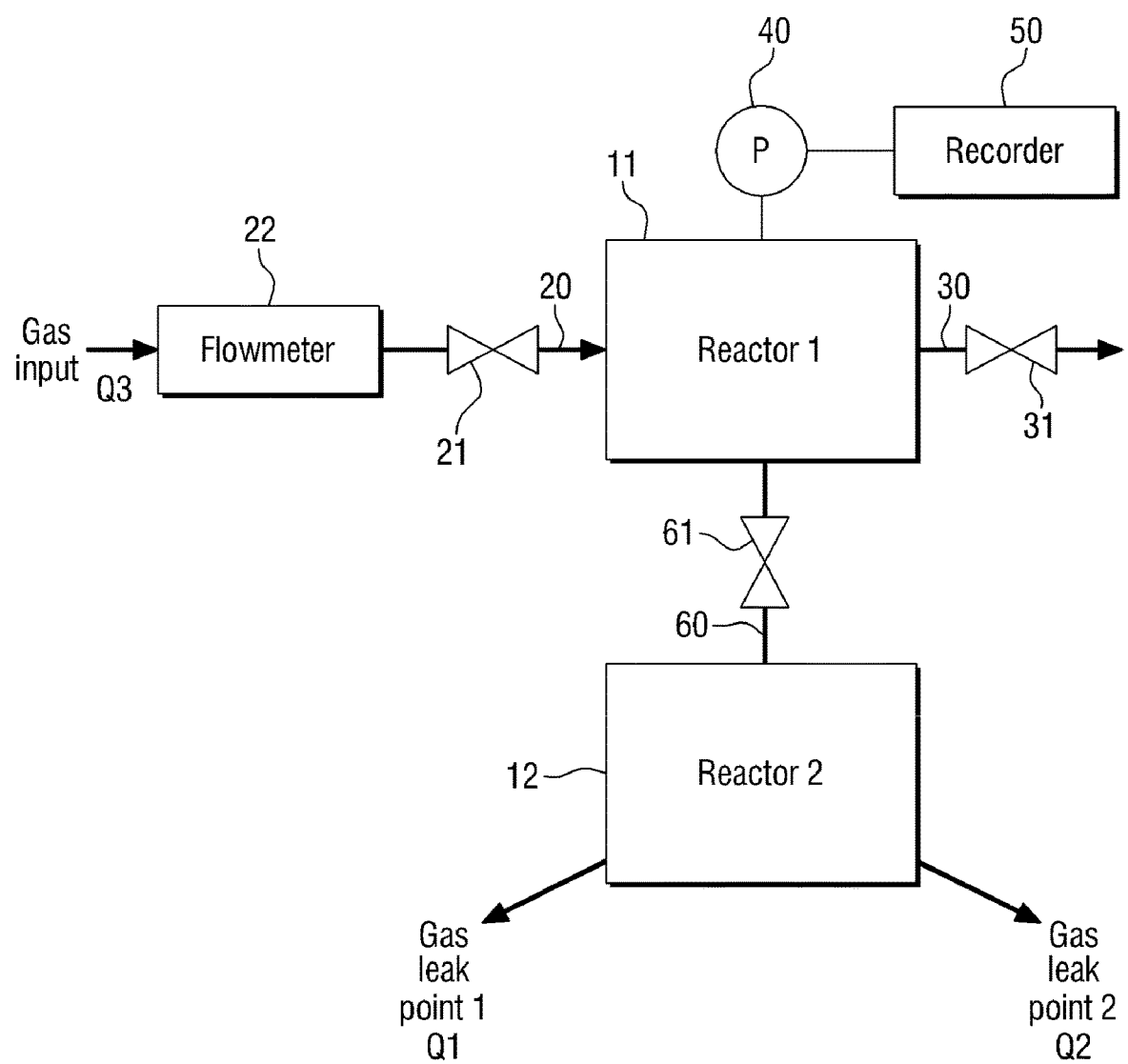

APPARATUS AND METHOD FOR GAS LEAKAGE MEASUREMENT IN A HIGH PRESSURE REACTOR

CROSS-REFERENCE TO RELATED APPLICATION

The present application claims priority to and the benefit of Korean Patent Application No. 10-2018-0047454 filed in the Korean intellectual Property Office on Apr. 24, 2018, the entire contents of which are incorporated herein by reference.

BACKGROUND

Technical Field

The present invention relates to an apparatus and method for gas leakage measurement in a high pressure reactor. In particular, the present invention relates to an apparatus and method for measuring the gas leakage status, the amount of gas-leaking, and the gas leak point in a reactor and a vessel which are operated under the condition of a high pressure, and also in a system in which the above reactor(s) or vessel(s) are connected by pipes and/or tubes.

Description of the Related Art

It is difficult to determine whether the gas leaks or not in a reactor and a vessel which are operated under the condition of a high pressure, and also in a system in which the above reactor(s) or vessel(s) are connected by pipes and/or tubes. It is also difficult to accurately measure the amount of gas-leaking.

In general, used is a method for determining the gas leakage status and the gas leak point through verifying whether bubbles are generated or not after dipping a high pressure reactor in a water bath, so as to verify the gas leakage status in a high pressure reactor. However, since when the volume of the reactor or the vessel is large, the size of the water bath should become big, it is occasionally happened that hardly could this method be used substantially.

FIG. 1 shows a perspective view of a conventional apparatus 1 for measuring the gas leakage status through a pressure gauge. As shown in FIG. 1, the gas leakage status is determined by the steps of: equipping a pressure gauge to a high pressure reactor 10 or a vessel; blocking a gas output 30 of the reactor (or vessel) (in FIG. 1, a second valve 31 is used, but it is possible to use a blind flange); injecting a high-pressure gas in the state of opening a first valve 21 equipped to a gas input 20; and closing the first valve 21 when an internal pressure of the reactor 10 (or vessel) reaches a preset pressure; and determining the gas leakage status by verifying whether the pressure is maintained for a predetermined period of time.

The aforementioned method is capable of determining the gas leakage status, but hardly could it measure the accurate amount of gas-leaking.

Further, when several reactors are connected to each other by complex pipes and/or tubes, since valves (or blind flanges) should be equipped to the respective pipes and/or tubes to use the aforementioned method, needed are valves (or blind flanges) which are not substantially necessary in the system.

Further, even if it is verified there is no gas leakage in the pipes and/or tubes themselves through testing for the gas leakage status, since, when connecting the whole system through the pipes and/or tubes, the gas leakage can be occurred between the respective pipes and/or tubes, it is needed to verify the gas leakage status and to measure the amount of gas-leaking in the whole system.

Especially, when a gas used in the whole system is toxic or harmful to a human body, or a high-priced gas is used, it is essential to verify the gas leakage status and to measure the amount of gas-leaking.

RELATED ART DOCUMENT

Patent Document (Patent Document 1) Japanese Patent Laid-Open Publication No. 2005-37268
(Patent Document 2) Korea Patent Publication No. 0291635
(Patent Document 3) Japanese Patent Laid-Open Publication No. H11-351922
(Patent Document 4) Korea Patent Publication No. 0929580

SUMMARY OF THE INVENTION

Therefore, the present invention is provided to overcome conventional problems as described above. According to one exemplary embodiment of the present invention, provided are an apparatus and method for measuring the gas leakage status, the amount of gas-leaking, and the gas leak point in a reactor and a vessel which are operated under the condition of a high pressure, and also in a system in which the above reactor(s) or vessel(s) are connected by pipes.

Further, according to another exemplary embodiment of the present invention, provided are an apparatus and method for measuring the amount of gas-leaking in a high pressure reactor, thereby finding out the gas leak point in a plurality of reactors through one flowmeter and one pressure gauge, simultaneously with measuring the amount of gas-leaking in the respective reactors.

Meanwhile, technical problems to be achieved by the present invention are not limited to the above-mentioned technical problems, and other technical problems of the present invention will be clearly understood by those of ordinary skilled in the art from the following description.

A primary object of the present invention is to provide an apparatus for gas leakage measurement in a high pressure reactor including: a gas inlet through which a gas is flowed in a reactor; a first valve which is equipped to one side of the gas inlet; a flowmeter which is equipped to a front-end of the first valve and measures a gas flow; a pressure gauge which measures an internal pressure of the reactor in real time; a gas outlet through which an internal gas of the reactor is flowed out; and a second valve which is equipped to one side of the gas outlet, wherein the gas leakage status in the reactor may be measured through pressure changes in the pressure gauge by opening the first valve and injecting a gas to the reactor by the flowmeter in the state of closing the second valve.

In addition, the flowmeter may have a reverse flow protection function so that a gas is flowed in only toward the reactor, and may further include a recorder on which is saved a pressure value measured in the pressure gauge in real time to record changes.

Further, if a pressure reaches a preset pressure after closing the second valve and injecting a gas in the state of opening the first valve, the flowmeter is adjusted to 0 to prevent further gases from injected any more. At this time, if the pressure is decreased, it may be determined that there is a gas leakage. The apparatus for gas leakage measurement in a high pressure reactor may include a control part, which controls the flowmeter to reach a pressure equalized state by injecting a gas through the flowmeter and determines that the amount of gas injection in the pressure equalized state is the amount of gas-leaking.

A secondary object of the present invention is to provide a method for gas leakage measurement in a high pressure including the steps of: opening a first valve equipped to one side of a gas inlet through which a gas is flowed in a reactor and injecting a gas into the reactor through a flowmeter equipped to a front-end of the first valve in the state of closing a second valve equipped to one side of a gas outlet through which an internal gas of the reactor is flowed out; measuring an internal pressure of the reactor in real time by a pressure gauge; adjusting the amount of the gas injected through the flowmeter to 0 when a pressure value measured by the pressure gauge reaches a preset pressure, and measuring the gas leakage status in the reactor through pressure changes in the pressure gauge: and determining there is no gas leakage if there is no pressure changes, while determining there is a gas leakage in the reactor if a pressure is decreased.

Wherein, after the step of determining there is a gas leakage, a control part controls the flowmeter to reach a pressure equalized state by injecting a gas through the flowmeter and it is determined that the amount of gas injection in the pressure equalized state is the amount of gas-leaking.

A thirdly object of the present invention is to provide an apparatus for gas leakage measurement in a high pressure reactor, in particular, an apparatus for measuring the amount of gas-leaking and a gas leak point in a plurality of high pressure reactors including: a gas inlet through which a gas is flowed in a first reactor; a first valve which is equipped to one side of the gas inlet; a flowmeter which is equipped to a front-end of the first valve and measures a gas flow; a pressure gauge which measures internal pressures of the first reactor and a second reactor in real time; a recorder on which is saved a pressure value measured in the pressure gauge in real time to record changes; a gas outlet through which an internal gas of the first reactor is flowed out; a second valve which is equipped to one side of the gas outlet; and a connection pipe which connects the first reactor and the second reactor and a third valve which is equipped to one side of the connection pipe, wherein, if an internal pressure reaches a preset pressure by closing the second valve and injecting gases to the first reactor and second reactor in the state of opening the first valve and the third valve, the amount of the gas injected through the flowmeter is adjusted to 0 and the gas leakage status in the reactors is then determined through pressure changes in the pressure gauge.

A fourthly object of the present invention is to provide a method for gas leakage measurement in a high pressure reactor, in particular, a method for measuring the amount of gas-leaking and the gas leak point in a plurality of high pressure reactors including the steps of: opening a first valve equipped to one side of a gas inlet of a first reactor, closing a second valve equipped to one side of a gas outlet which is connected to the other side of the first reactor and through which a gas is flowed out, and injecting a gas to first and a second reactors through a flowmeter equipped to a front-end of the first valve in the state of opening a third valve equipped to one side of a connection pipe between the first reactor and the second reactor; measuring internal pressures of the first and second reactors in real time by a pressure gauge; measuring the gas leakage status in the first and second reactors through pressure changes in a pressure gauge after adjusting the amount of the gas injected through the flowmeter to 0 if a pressure value measured by the pressure gauge reaches a preset pressure; determining there is no gas leakage if there is no pressure changes, while determining there is a gas leakage in at least one of the first reactor and the second reactor if the pressure is decreased; and if determining there is a gas leakage, controlling the flowmeter to reach a first pressure equalized state by injecting a gas through the flowmeter and determining that the amount of gas injection in the first pressure equalized state is the amount of gas-leaking in the first and second reactors.

In addition, in the thirdly and fourthly objects of the present invention, if a pressure value is decreased in the state of adjusting the amount of the gas injected through the flowmeter to 0, it is determined there is a gas leakage in the first and second reactor. The apparatus for measuring the amount of gas-leaking and the gas leak point in a plurality of high pressure reactors may further include a control part, which controls the flowmeter to reach a first pressure equalized state by injecting a gas through the flowmeter. It is determined that the amount of gas injection in the first pressure equalized state is the amount of gas-leaking in the first and second reactors.

Further, in the thirdly and fourthly objects of the present invention, if the first pressure equalized state is maintained in the state of closing the third valve after reaching to the first pressure equalized state, it is determined that there is no gas leakage in the second reactor and the amount of gas injection in the first pressure equalized state is the amount of gas-leaking in the first reactor.

Further, in the thirdly and fourthly objects of the present invention, if a pressure value of the pressure gauge is increased and the first pressure equalized state is maintained even though a gas is not injected through the flowmeter in the state of closing the third valve after reaching the first pressure equalized state, it is determined that there is no gas leakage in the first reactor and the amount of gas injection in the first pressure equalized state is the amount of gas leaking in the second reactor.

Further, in the thirdly and fourthly objects of the present invention, if the pressure value of the pressure gauge is increased in the state of closing the third valve after reaching the first pressure equalized state, the control part may decrease the amount of gas injection in the flowmeter to reach a second pressure equalized state, it is determined that the amount of gas injection in the second pressure equalized state is the amount of gas leaking in the first reactor and it is determined that a difference between each of the amounts of gas injection in the first pressure equalized state and the second pressure equalized state respectively is the amount of gas leaking in the second reactor.

An apparatus and method for gas leakage according to an exemplary embodiment of the present invention are capable of measuring the gas leakage status, the amount of gas-leaking, and the gas leak point in a reactor and a vessel which are operated under the condition of a high pressure, and also in a system in which the above reactor(s) or vessel(s) are connected by pipes and/or tubes.

Further, an apparatus and method for gas leakage according to another exemplary embodiment of the present invention are capable of finding out the gas leak point in a plurality of reactors through one flowmeter and one pressure gauge, simultaneously with measuring the amount of gas-leaking in the respective reactors.

Meanwhile, effects of the present invention are not limited to the aforementioned effects, another effect of the present invention not covered will be clearly understood to those of ordinary skilled in the art from the following description.

BRIEF DESCRIPTION OF THE DRAWINGS

The foregoing features of the present invention will become more fully apparent from the following description, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 1 is a perspective view showing a conventional apparatus for measuring the gas leakage status in a high pressure reactor.

FIG. 2 is a perspective view showing an apparatus for measuring the gas leakage status in a high pressure reactor according to the first exemplary embodiment of the present invention.

FIG. 3 is a flowchart of a method for gas leakage measurement in a high pressure reactor according to the first exemplary embodiment of the present invention.

FIG. 4 is a perspective view showing a method for gas leakage measurement according the first exemplary embodiment of the present invention.

FIG. 5 is a perspective view showing a state for gas leakage measurement in a first reactor and a second reactor according to the second exemplary embodiment of the present invention.

FIG. 6 is a flowchart of a method for gas leakage measurement in a high pressure reactor according to the second exemplary embodiment of the present invention.

FIG. 7 is a perspective view showing a state that there is a gas leakage only in the first reactor according to the second exemplary embodiment of the present invention.

FIG. 8 is a perspective view showing a state that there is a gas leakage only in the second reactor according to the second exemplary embodiment of the present invention.

DETAILED DESCRIPTION OF THE EMBODIMENTS

The above and other features, objects and advantages of the present invention will now be more clearly understood from the following preferred exemplary embodiments with the accompanying drawings. However, the present invention is not limited to the exemplary embodiments set forth herein and may be embodied in many different forms. Rather, these embodiments are provided so that this disclosure will be thorough and complete, and will fully convey the scope of the invention to those skilled in the art.

In the detailed description of the present invention, when mentioning that an element is present on another element, it means either that it may be formed directly thereon, or that a third configuration may be provided therebetween. In addition, in the drawings, thicknesses of elements may be overstated for effective explanation of technical contents.

The exemplary embodiments of the present invention will be explained with reference to to end views and/or top plan views which are ideal exemplary views of the present invention. In the drawings, thicknesses of layers or regions may be overstated for the effective explanation of the technical contents. Thus, forms of the exemplary views may be modified according to manufacturing technologies and/or allowable errors. Therefore, the exemplary embodiments of the present invention are not limited to specifically depicted forms. For instance, a region depicted as a right angle may be forms of rounded or having a predetermined curvature. Accordingly, regions depicted in exemplary drawings have characteristics, and shapes thereof are examples of specific forms of the regions of elements but not limitative to the scope of the present invention. In various exemplary embodiments of the present invention, terms, such as 'a first' and 'a second', are used to describe various elements, but they are not limitative to the elements. These terms are used only for the purpose of distinguishing a certain element from the others. The exemplary embodiments described herein include exemplary embodiments complementary thereto.

The terminology used herein is for the purpose of describing particular embodiments only and is not intended to be limiting of the invention. As used herein, the singular forms 'a', 'an' and 'the' are intended to include the plural forms as well, unless the context clearly indicates otherwise. It will be further understood that the terms 'comprises' and/or 'comprising', when used in this description, do not preclude the presence or addition of one or more other elements, components.

Unless otherwise defined, all terms herein have the same meaning as commonly understood by one of ordinary skilled in the art to which the present invention belongs. It will be further understood that terms, such as those defined in commonly used dictionaries, should be interpreted as having a meaning that is consistent with their meaning in the context of the relevant art and will not be interpreted in in an idealized or overly formal sense unless expressly so defined herein.

Hereinafter, according to the exemplary embodiment of the present invention, explained are configurations and functions of an apparatus for gas leakage measurement in a high pressure reactor, and a method therefor. The exemplary embodiments of the present invention are for the purpose of measuring the gas leakage status and the amount of gas-leaking in a high pressure reactor, a reactor, and a system constituted by connecting them (hereinafter, they are all referred to as a reactor. The reactor described in this description should be interpreted as including a high pressure reactor, a reactor and a system constituted by connecting them).

Firstly, FIG. 2 is a perspective view showing an apparatus 100 for measuring the gas leakage status according to the first exemplary embodiment of the present invention. As shown in FIG. 2, the apparatus 100 for measuring the gas leakage status includes a gas inlet 20 through which a gas is flowed in a reactor 10, a first valve 21 which is equipped to one side of the gas inlet, a flowmeter which is equipped to a front-end of the first valve, is capable of measuring a gas flow and flows a gas in the reactor, a pressure gauge 40 which measures an internal pressure of the reactor 10 in real time, a gas outlet 30 through which an internal gas of the reactor 10 is flowed out, a second valve 31 which is equipped to one side of the gas outlet 30, and a recorder 50 on which is saved a pressure value measured in the pressure gauge 40 in real time to record changes. Further, the flowmeter 22 has a reverse flow protection function so that a gas is flowed in only toward the reactor.

Hereinafter, a method for measuring the gas leakage status and the amount of gas-leaking in the reactor 10 will be described according to the first exemplary embodiment of the present invention. FIG. 3 is a flowchart of a method for gas leakage measurement in a high pressure reactor according to the first exemplary embodiment of the present invention.

The method for measuring the gas leakage status and the amount of gas-leaking in the reactor 10 through this apparatus 100 may measure an internal pressure the pressure gauge 40 (S2) by closing the second valve 31, and injecting a gas to the reactor 10 by the flowmeter 22 in a state of opening the first valve 21 (S1). The gas leakage status in the reactor 10 is determined through pressure changes in the pressure gauge 40 by adjusting the flowmeter 22 to 0 to prevent further gases from injected any more when the internal pressure reaches a predetermined pressure (S3).

That is, pressure changes as the times change are observed (S4) and if there is no pressure change, it is determined there is no gas leakage in the reactor 10. On the other hand, if an internal pressure is decreased as the times change, it is determined there is a gas leakage therein.

Hereinafter, a method for gas leakage measurement when there is a gas leakage will be explained. FIG. 4 is a perspective view showing a method for gas leakage measurement according the first exemplary embodiment of the present invention.

As shown in FIG. 4, as an example, it is explained that there are gas leakages corresponding to the respective amounts of gas flows, Q1 and Q2 at two gas leak points (gas leak point 1, and 2) in the reactor 10, and a gas is injected in the amount of a gas flow, Q3, through the flowmeter 22.

As aforementioned, if there is a gas leakage, a pressure value is decreased and at this time, a gas is injected through the flowmeter 22 (S5). When the amount of the gas flow, Q3, injected through the flowmeter 22 is smaller than the amount of leaked gas flows (Q1+Q2), (Q3<Q1+Q2), the pressure of the reactor 10 is deceased as the times change. On the other hand, when the amount of the gas flow, Q3, injected through the flowmeter 22 is greater than the amount of leaked gas flows (Q1+Q2), (Q3>Q1+Q2), the pressure of the reactor 10 is increased as the times change.

As the above, as observing pressure changes in the reactor 10 while changing gas flows injected through the flowmeter 22, it is possible to find out the amount of gas injection in the pressure equalized state in which the pressure of a system is not changed any more (the pressure is maintained) (S6). Since, the amount of gas injection in this pressure equalized state corresponds to the amounts of gas flows leaked from the reactor 10 (Q3=Q1+Q2), it is possible to accurately measure the amount of gas-leaking in the reactor 10 (S7).

Further, as using a method of the present invention, it is possible to easily and rapidly measure and determine the gas leakage status and the amount of gas-leaking through one flowmeter 22 and one pressure gauge 40, in an apparatus in which a plurality of reactors are connected.

FIG. 5 is a perspective view showing a state for gas leakage measurement in a first reactor 11 and a second reactor 12 according to the second exemplary embodiment of the present invention. FIG. 6 is a flowchart of a method for gas leakage measurement in a high pressure reactor according to the second exemplary embodiment of the present invention.

Firstly, opened is the first valve 21 which is equipped to one side of the gas inlet 20 through which a gas is injected in the first reactor 11 and the second reactor 12 connected with the first reactor 11 by a connection pipe 60 and closed is the second valve 31 equipped to one side of a gas outlet 30 which is connected to another side of the first reactor 11 and through which the gas is flowed out, and a gas is injected in the reactor through the flowmeter 22 which is equipped to a front end of the first valve 21 in the state of opening a third valve 61 equipped to the connection pipe 60 (S10). And an internal pressure is then measured in real time by the pressure gauge 40 (S20).

Further, when a pressure value measured by the pressure gauge 40 reaches a predetermined pressure, after adjusting the amount of the gas injected through the flowmeter to 0, the gas leakage status in the first and second reactors 11 and 12 is measured through pressure changes in the pressure gauge 40 (S30).

If there is no pressure change, it is determined there is no gas leakage (S40). If a pressure is decreased, it is determined there is a gas leakage in at least one of the first reactor 11 and the second reactor 12. In addition, if it is determined there is a gas leakage, a control part controls the flowmeter 22 to reach a first pressure equalized state by injecting a gas through the flowmeter 22, and it is determined that the amount of gas injection in the state of the first pressure equalized state is the amount of gas-leaking in the first and second reactors 11 and 12 (S50).

In particular, as shown in FIG. 5, it is explained that there is a gas leakage corresponding to Q1 at the gas leak point 1 in the first reactor 11, and there is also a gas leakage corresponding to Q2 at the gas leak point 2 in the second reactor 12.

In a determination condition of the amount of gas-leaking (that is, a condition that a pressure of the reactor is consistent in the state of injecting a gas flow of Q3 (the first pressure equalized state)), if closing the third valve 61 at Q3=Q1+Q2 (S60), the amount of gas-leaking in the second reactor 12 has no effect on a pressure measured in the pressure gauge 40, and since Q3>Q1, a pressure of the system is increased (S70).

At this time, if finding out a condition that a pressure of the system is consistent (the second pressure equalized state) while decreasing a gas flow injected through the flowmeter 22 (S80), since the amount of a gas flow at this time (the amount of gas injection in the second pressure equalized state) corresponds to the amount of a gas flow Q1 leaked from the first reactor 11, it is possible to accurately measure the amount of gas-leaking in the first reactor 11. In addition, since the amount of an initial gas flow Q3 (the amount of gas injection in the first pressure equalized state) has been known, it is possible to know the amount of a gas flow leaked from the second reactor 12 (Q2=Q3−Q1) (S90).

FIG. 7 is a perspective view showing a state that there is a gas leakage only in the first reactor 11 according to the second exemplary embodiment of the present invention. In the state of injecting a gas Q3 to maintain the first pressure equalized state, if a pressure value is maintained even though closing the third valve 61 (S100), there is no gas leakage in the second reactor 12 and it is determined that the amount of gas-leaking in the first reactor 11 is the amount of gas injection in the first pressure equalized state (S110).

That is, as shown in FIG. 7, when there is a leak point only in the first reactor 11, there is no pressure change even though closing the third valve 61 in the determination condition of the total amount of gas-leaking Q3 and in this case, it can be known that a gas corresponding to the total amount of gas-leaking is leaked from the first reactor 11.

FIG. 8 is a perspective view showing a state that there is a gas leakage only in the second reactor 12 according to the second exemplary embodiment of the present invention. That is, as shown in FIG. 8, when there is a leak point only in the second reactor 12, a pressure of the reactor is increased if closing the third valve 61 in the determination condition of the amount of gas injection Q3 in the first pressure equalized state, and since there is no leak point in the first reactor 11, a pressure of the reactor is not changed even without injecting a gas through the flowmeter 22 (S120). Thus, in this case, it can be known that the total amount of gas injection Q3 determined initially in the first pressure equalized state is the amount of gas-leaking in the second reactor 12 (S130).

Further, the apparatus and method described above are not limited to the above described configurations and method of the exemplary embodiments of the present invention but various modifications may be made thereto by selectively combing part of or the whole of the respective exemplary embodiments.

DESCRIPTION OF SYMBOL

1: conventional apparatus for gas leakage measurement
10: reactor
11: first reactor
12: second reactor
20: gas inlet
21: first valve
22: flowmeter
30: gas outlet
31: second valve
40: pressure gauge
50: recorder
60: connection pipe or tube
61: third valve
100: apparatus for gas leakage measurement in a high pressure reactor

What is claimed is:

1. An apparatus for gas leakage measurement in a high pressure reactor, the apparatus for measuring the amount of gas-leaking and a gas leak point in a plurality of high pressure reactors, the apparatus comprising:
   a gas inlet through which a gas is flowed in a first reactor;
   a first valve which is equipped to one side of the gas inlet;
   a flowmeter which is equipped to a front-end of the first valve and measures a gas flow;
   a pressure gauge which measures internal pressures of the first reactor and a second reactor in real time;
   a gas outlet through which an internal gas of the first reactor is flowed out;
   a second valve which is equipped to one side of the gas outlet;
   a connection pipe which connects the first reactor and the second reactor; and
   a third valve which is equipped to one side of the connection pipe,
   wherein the gas leakage status in the first reactor and the second reactor is measured through pressure changes in the pressure gauge by opening the first valve and the third valve and injecting a gas into the reactors by the flowmeter in the state of closing the second valve,
   wherein the flowmeter has a reverse flow protection function so that the gas is only flowed in the reaction side, and comprises a recorder on which is saved a pressure value measured in the pressure gauge in real time to record changes,
   wherein if an internal pressure reaches a preset pressure by closing the second valve and injecting gases to the first reactor and second reactor in the state of opening the first valve and the third valve, the amount of the gas injected through the flowmeter is adjusted to zero to prevent further gases from being injected and the gas leakage status in the reactors is then determined through pressure changes in the pressure gauge,
   wherein if a pressure value is decreased in the state of adjusting the amount of the gas injected through the flowmeter, it is determined there is a gas leakage in the first and second reactors, and
   wherein the apparatus for gas leakage measurement further comprises a control part which controls the flowmeter to reach a first pressure equalized state by injecting a gas through the flowmeter, and determines that the amount of gas injection in the first pressure equalized state is the amount of gas-leaking of the first and second reactors.

2. The apparatus for gas leakage measurement in a high pressure reactor of claim 1, wherein
   if the first pressure equalized state is maintained in the state of closing the third valve after reaching to the first pressure equalized state, it is determined that there is no gas leakage in the second reactor and the amount of gas injection in the first pressure equalized state is the amount of gas-leaking in the first reactor.

3. The apparatus for gas leakage measurement in a high pressure reactor of claim 2, wherein
   if a pressure value of the pressure gauge is increased and the first pressure equalized state is maintained even though a the gas is not injected through the flowmeter in the state of closing the third valve after reaching the first pressure equalized state, it is determined that there is no gas leakage in the first reactor and the amount of gas injection in the first pressure equalized state is the amount of gas leaking in the second reactor.

4. The apparatus for gas leakage measurement in a high pressure reactor of claim 3, wherein
   if a pressure value of the pressure gauge is increased in the state of closing the third valve after reaching the first pressure equalized state, the control part decreases the amount of gas injection in the flowmeter to reach a second pressure equalized state, it is determined that the amount of gas injection in the second pressure equalized state is the amount of gas-leaking in the first reactor and it is determined that a difference between each of the amounts of gas injection in the first pressure equalized state and the second pressure equalized state respectively is the amount of gas leaking in the second reactor.

* * * * *